(12) United States Patent
Woo

(10) Patent No.: US 12,296,835 B2
(45) Date of Patent: May 13, 2025

(54) VEHICLE PREDICTIVE CONTROL METHOD WITH IMPROVED COMPUTATIONAL PROCESSING AND VEHICLE DRIVING CONTROL SYSTEM USING THE SAME

(71) Applicants: Hyundai Motor Company, Seoul (KR); Kia Corporation, Seoul (KR)

(72) Inventor: Min Soo Woo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 329 days.

(21) Appl. No.: 17/879,461

(22) Filed: Aug. 2, 2022

(65) Prior Publication Data

US 2023/0234596 A1    Jul. 27, 2023

(30) Foreign Application Priority Data

Jan. 24, 2022   (KR) .................. 10-2022-0010107

(51) Int. Cl.
| | |
|---|---|
| *B60W 50/00* | (2006.01) |
| *B60W 10/08* | (2006.01) |
| *B60W 10/18* | (2012.01) |
| *B60W 30/16* | (2020.01) |

(52) U.S. Cl.
CPC ........ *B60W 50/0097* (2013.01); *B60W 10/08* (2013.01); *B60W 10/18* (2013.01); *B60W 30/16* (2013.01); *B60W 2520/00* (2013.01); *B60W 2552/15* (2020.02); *B60W 2554/80* (2020.02); *B60W 2555/60* (2020.02)

(58) Field of Classification Search
CPC .. B60W 50/0097; B60W 10/08; B60W 10/18; B60W 30/16; B60W 2555/60; B60W 2552/15; B60W 2554/80
See application file for complete search history.

(56) References Cited

U.S. PATENT DOCUMENTS

| | | | |
|---|---|---|---|
| 9,061,686 B2 | 6/2015 | Yu et al. | |
| 2015/0329114 A1* | 11/2015 | Yoo ..................... | B60W 30/143 701/93 |
| 2018/0201262 A1* | 7/2018 | Yoon .................... | B60W 10/10 |
| 2019/0378039 A1* | 12/2019 | Zamanzad Gavidel ..................... G06N 20/00 | |
| 2020/0132844 A1 | 4/2020 | Wolf et al. | |
| 2020/0231149 A1* | 7/2020 | Eggert ................... | G08G 1/166 |
| 2021/0237728 A1 | 8/2021 | Wessel et al. | |

(Continued)

FOREIGN PATENT DOCUMENTS

| | | | | |
|---|---|---|---|---|
| CN | 109131350 A | * | 1/2019 | .......... B60W 40/076 |
| JP | 6099090 B2 | | 3/2017 | |

(Continued)

*Primary Examiner* — George C Jin
(74) *Attorney, Agent, or Firm* — Fox Rothschild LLP

(57) ABSTRACT

Disclosed herein is a vehicle predictive control method that includes determining a driving prediction horizon in front of a vehicle, dividing the driving prediction horizon into a plurality of steps, at least some of the steps corresponding to a sloped section being integrated into one step according to slopes, and applying a driving prediction model based on a relationship between states of vehicle speed, traction force, and braking force for each step and collectively computing the driving prediction model over the entire prediction horizon to calculate a control value for the vehicle.

13 Claims, 22 Drawing Sheets

(56) References Cited

U.S. PATENT DOCUMENTS

2022/0063616 A1* 3/2022 Lee .................. G06N 3/08
2023/0234596 A1* 7/2023 Woo .................. B60W 10/18
701/41

FOREIGN PATENT DOCUMENTS

| KR | 101601104 B1 | 3/2016 |
| KR | 2016-0061640 A | 6/2016 |
| KR | 2018-0080933 A | 7/2018 |
| WO | 2017-221233 A1 | 12/2017 |

* cited by examiner

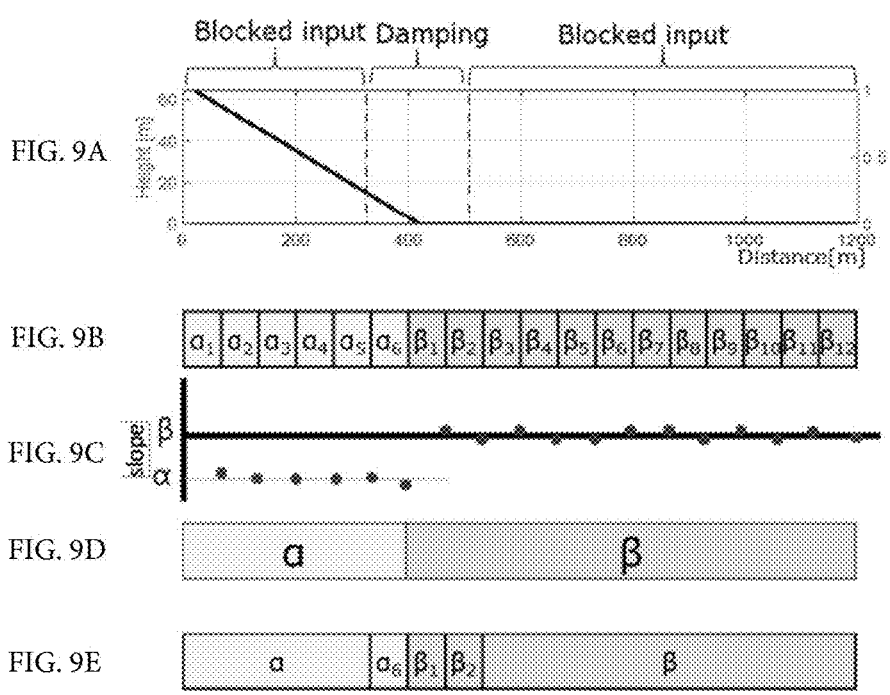

$D_e$ : Ego car's distance $\qquad D_p$ : Preceding car's distance
$v_e$ : Ego car's velocity $\qquad v_p$ : Preceding car's velocity

VEHICLE PREDICTIVE CONTROL METHOD WITH IMPROVED COMPUTATIONAL PROCESSING AND VEHICLE DRIVING CONTROL SYSTEM USING THE SAME

CROSS-REFERENCE TO RELATED APPLICATION(S)

This application claims, under 35 U.S.C. § 119(a), the benefit of Korean Patent Application No. 10-2022-0010107, filed on Jan. 24, 2022, the disclosure of which is incorporated herein by reference in its entirety.

BACKGROUND

Technical Field

Embodiments of the present disclosure relate to a vehicle predictive control method with improved computational processing and a vehicle driving control system using the same.

Description of the Related Art

Model predictive control (MPC) has been rapidly and widely used in the field of automobile control in recent years. MPC needs to reduce computational loads because it obtains a better solution by taking as much information as possible (i.e., a longer prediction horizon) in calculation, step by step.

Of course, these changes are gradually diminishing as the computing power of microprocessors increases exponentially due to improvements in hardware. However, software approaches to addressing them have to be constantly reviewed, since high-performance hardware may lead to an increase in cost.

Meanwhile, in recent years, driving technology has been steadily developed to improve driver's driving convenience, and the capabilities thereof are increasingly being improved.

For example, cruise control has evolved into smart cruise control that follows the stopping and starting of preceding vehicles beyond simple cruise control, enabling cruise control driving to take place on quiet suburban roads as well as on rather congested roads, such as in downtown areas.

Such cruise control is expected to further advance with the development of autonomous driving technology.

However, conventional cruise control is designed in consideration of only driving convenience or safety, and not in consideration of energy efficiency.

Under the policy for reducing $CO_2$ emission, countries around the world are strengthening support for eco-friendly vehicles such as electric vehicles. Accordingly, it is expected that vehicles with internal combustion engines will be invisible on the roads in the near future.

These eco-friendly vehicles are generally driven by motors powered by greed energy. For example, hybrid vehicles or electric vehicles are driven by motors supplied with power from batteries mounted thereon.

For an electric vehicle, the mileage on a single battery charge is very important. Accordingly, although battery technology is continuously being developed, driving control technology is important in addition to battery technology to ensure that the vehicle is driven at optimal energy efficiency.

In particular, since conventional cruise control is insufficient in terms of energy efficiency as described above, an optimally efficient driving control is required to increase the fuel efficiency of the electric vehicle. Preferably, there is a need to reduce computational loads as described above.

SUMMARY

Objects of the present disclosure are directed to a vehicle predictive control method with improved computational processing and a vehicle driving control system using the same that substantially obviate one or more problems due to limitations and disadvantages of the related art.

An object of the present disclosure is to provide a predictive control method that improves an amount and speed of computation of a driving predictive control model.

Another object of the present disclosure is to provide an optimally efficient driving control method for an eco-friendly vehicle powered by a battery, through improved computation.

A further object of the present disclosure is to provide a driving control method that achieves cruise control driving with optimum efficiency by means of a small amount of computation and a fast speed of computation for application to cruise control.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the present disclosure, as embodied and broadly described herein, there is provided a vehicle predictive control method that comprises determining a driving prediction horizon in front of a vehicle, dividing the driving prediction horizon into a plurality of steps, at least some of the steps corresponding to a sloped section being integrated into one step according to slopes, and applying a driving prediction model based on a relationship between states of vehicle speed, traction force, and braking force for each step and collectively computing the driving prediction model over the entire prediction horizon to calculate a control value for the vehicle.

The integration of the steps may be made in relation to an approximate slope ($\theta$) for the slopes.

The approximate slope may be calculated from an approximate linear function for the slopes.

The slopes may be obtained from slope data corresponding to the sloped section of a digital map.

The slopes may be approximated by a plurality of linear functions according to an error with the approximate slope.

The linear functions may be determined such that an average value of squares of the error to the number of linear functions is less than or equal to a threshold value.

The prediction model may include a battery power function for each step driving.

The prediction model may calculate the control value by calculating a minimum solution for the battery power function using at least one of an average vehicle speed constraint, a vehicle driving speed band constraint, a motor constraint for vehicle speed, a safe distance constraint from a preceding vehicle, and a safe vehicle speed constraint for road curvature.

The steps having the same approximate slope may be integrated into one step.

The steps before and after the point at which the approximate slope is changed may not be integrated into one step but remain unchanged.

The method may include calculating a vehicle speed for the steps before integration from the relationship based on the traction force and braking force calculated for the integrated one step.

In accordance with another aspect of the present disclosure, there is provided a vehicle driving control system that includes a driving strategy control unit configured to collect curvature and slope information, speed limit information, and enforcement camera location information for a road section in a forward driving prediction horizon, and to collect distance information from a preceding vehicle from a sensor to calculate a control value for a vehicle from a driving prediction model for the prediction horizon using at least one of an average vehicle speed constraint, a vehicle driving speed band constraint, a motor constraint for vehicle speed, a safe distance constraint from a preceding vehicle, and a vehicle speed constraint for road curvature, and a driving assistance unit configured to output a control signal for a motor and a brake based on the control value. The driving strategy control unit is configured to divide the driving prediction horizon into a plurality of steps, at least some of the steps corresponding to a sloped section being integrated into one step according to slopes, and then to apply the driving prediction model for each step and collectively compute the driving prediction model over the entire prediction horizon to calculate the control value.

Further provided are vehicles that comprise a vehicle control system as disclosed herein, and vehicles that utilize a method of providing vehicle predictive control as disclosed herein.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the disclosure, without being limited thereto, and together with the description help for the better understanding of the disclosure. In the drawings:

FIG. 9A-9E illustrates a process of approximating slopes to reduce the number of steps in the prediction horizon;

DETAILED DESCRIPTION

Figure 1:
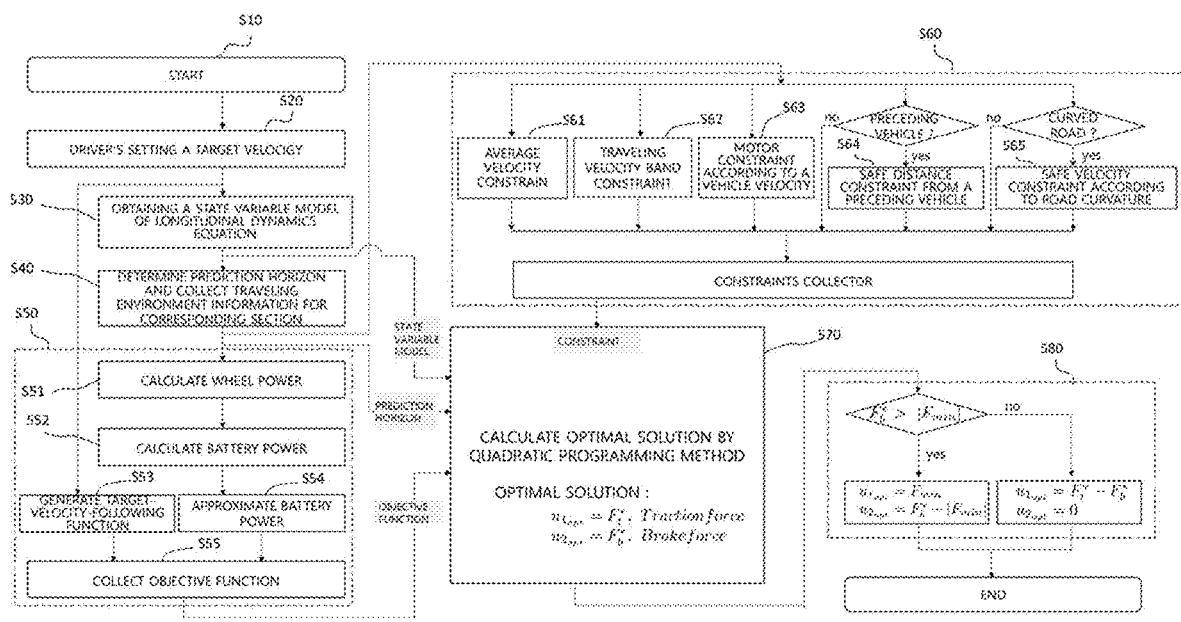
FIG. 1 illustrates a flowchart of an exemplary embodiment of the present disclosure.

Specific embodiments will be described with reference to the accompanying drawings since the present disclosure may be subjected to various modifications and have various examples. It should be understood, however, that the present disclosure is not intended to be limited to the specific embodiments, but the present disclosure includes all modifications, equivalents or replacements that fall within the spirit and scope of the disclosure as defined in the following claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

As used herein, the suffixes "module" and "part" are used only for nomenclature between components, and should not be construed as implying that they are separated or otherwise capable of being separated physically and chemically.

Terms such as "first" and/or "second" may be used herein to describe various elements of the present disclosure, but these elements should not be construed as being limited by the terms. These terms will be used only for the purpose of differentiating one element from other elements of the present disclosure.

The term "and/or" is used to include any combination of multiple items in question. For example, "A and/or B" includes all three cases such as "A", "B", and "A and B".

It will be understood that when an element is referred to as being "coupled" or "connected" to another element, it can be directly coupled or connected to the other element or intervening elements may also be present.

Unless otherwise defined, all terms used herein, including technical and scientific terms, have the same meanings as those commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In addition, each unit or control unit is only a term widely used in naming a controller for controlling a specific function of the vehicle, and does not mean a generic functional unit. For example, each unit or control unit may include a communication device that communicates with other controllers or sensors to control the function it is responsible for, a memory that stores an operating system or logic commands and input/output information, and one or more processors that perform determination, calculation, decision, etc., necessary for controlling the function in charge thereof.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Figure 2:
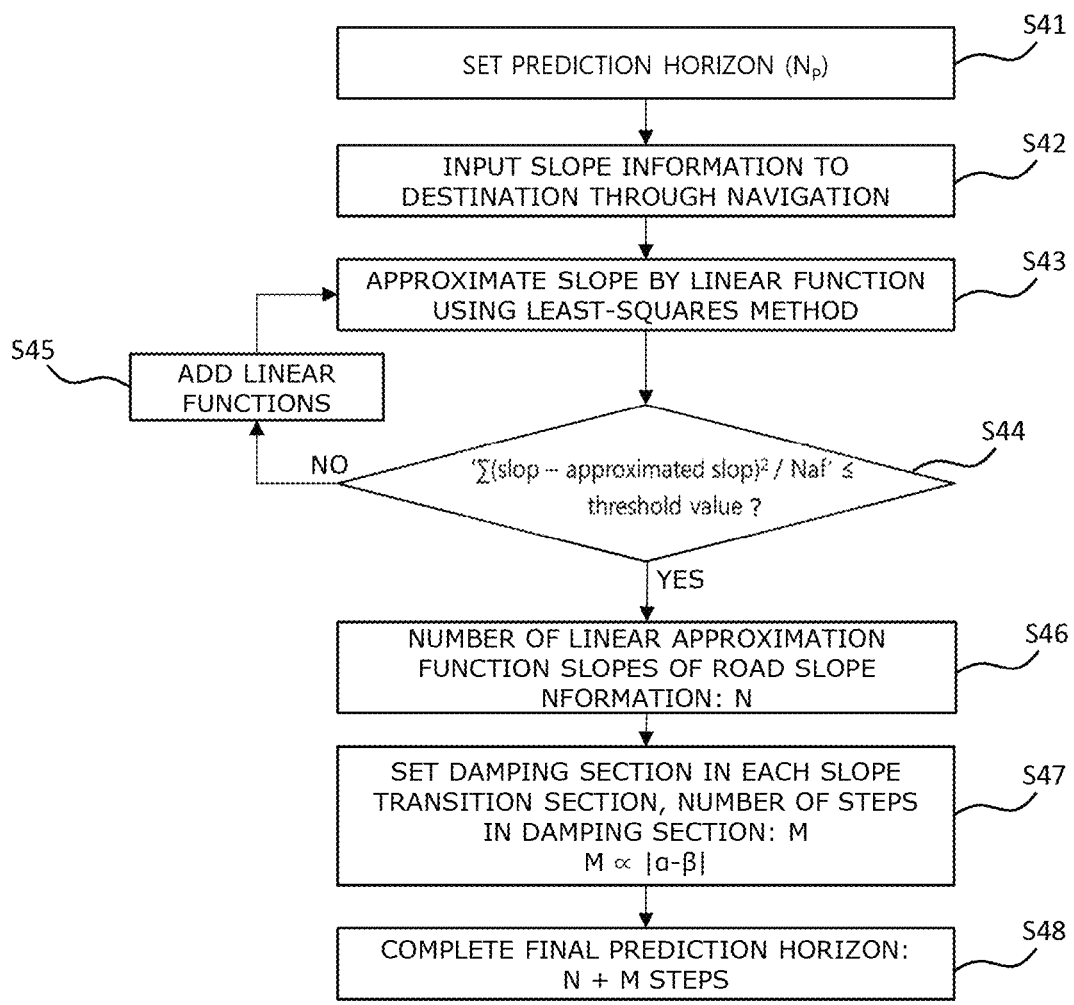
FIG. 2 is a flowchart illustrating a process of determining a step for a prediction horizon.

FIG. 1 is a flowchart of an optimal efficiency driving control method according to an exemplary embodiment of the present disclosure. FIG. 2 is a flowchart illustrating a process of determining a step for a prediction horizon according to an exemplary embodiment.

First, the driving control method of the embodiment may be implemented by a vehicle driving control system and mounted in a vehicle. For example, the driving control system includes a driving strategy control unit and a driving assistance unit, which will be described in detail later.

The driving control method of the embodiment may start from the selection of a driving mode by a driver (S10), for example. For example, a driving mode selector such as a selection button or a lever for selecting driving modes such as cruise control, smart cruise control, and pulse and glide may be provided in a vehicle within reach of a driver.

The driving control method of the embodiment may be implemented as an added part to existing driving technology, unless there is a special reason why it cannot be applied. For example, the control method of the embodiment may be applied to the cruise control, which may result in driving with improved energy efficiency compared to the control by the existing cruise control.

In addition, the driving control technology to which the driving control method of the embodiment may be applied may be referred to as, for example, "eco cruise control", which is differentiated from the existing technology.

The driving mode selector may be provided to select the eco cruise control, and the control method of the embodiment may be performed as the driver selects the eco cruise control.

The driving control method of the embodiment may be implemented by selecting and adding an additional function by the driver during driving control by another driving technique. For example, when an additional "eco" button is selected during driving in a normal cruise control driving mode, the control method of the embodiment may be implemented by switching to the cruise control driving mode.

When the control method of the embodiment starts (S10), a driver's target vehicle speed may be first set (S20). For example, the target vehicle speed may be determined by driver's selection or may be automatically set to a current vehicle driving speed.

Here, in the case of the above-mentioned "eco" button, the target vehicle speed setup (S20) may precede the start (S10) of the control method. That is, when the normal cruise control is selected, the target vehicle speed may be set (S20). Then, when the "eco" button is input, the control method may be performed (S10).

In other words, the order of the start command and the target vehicle speed setup of the control method is not limited to the embodiment, and may be changed in some embodiments.

Next, a longitudinal equation of motion may be modeled as state variables (S30).

Then, a prediction horizon may be determined and driving environment information about the prediction horizon may be collected (S40).

Next, objective functions are generated (S50). To this end, wheel power may be first computed (S51), and battery power may be computed using the computed wheel power (S52) and may be approximated (S54).

A target vehicle speed following function may be generated based on the driver's target vehicle speed setpoint (S53), and the objective functions are generated by determining each weight together with the approximated battery power function (S55).

The driving prediction model of the embodiment includes these objective functions, and target traction force and braking force are calculated from the minimum solutions of the objective functions by adding constraints to be described later.

Here, constraints are collected such as an average vehicle speed constraint, a vehicle driving speed band constraint, a motor constraint for vehicle speed, safe distance constraint from preceding vehicle, and a safe vehicle speed constraint for road curvature (S60).

The optimal solutions of the objective functions for that prediction horizon are calculated and calculated by adding these constraints, and the traction force and/or braking force are output (S70).

The distribution to regenerative braking and/or mechanical braking may be performed according to the output braking force (S80).

Hereinafter, the control method of the embodiment will be described in detail for each step.

1. Obtaining State Variable Model of Longitudinal Equation of Motion (S30)

FIG. 2 illustrates a vehicle traveling on a road having a longitudinal slope angle of θ. The longitudinal equation of motion for the same may be represented as in the following Equation 1:

$$\frac{1}{2}mv(k+1)^2 - \frac{1}{2}mv(k)^2 = \Delta s(F_t - F_b - F_{roll} - F_{air} - F_g) \quad \text{[Equation 1]}$$

where v(k) is the speed at the k-th step (see FIG. 6 and description of the step of the prediction horizon to be described later), $F_t$ is the wheel traction force, $F_b$ is the wheel braking force, m is the vehicle mass, $F_{roll}$ is the rolling resistance, Fair is the air resistance, $F_g$ is the gravity, and Δs is the distance traveled by one step.

From the above equation of motion, the model equation of state variable $v^2$ and input variables $F_t$ and $F_b$, may be obtained as represented in the following Equation 2.

$$x(k+1)=A_p x(k)+B_p u+B_\phi \Phi$$

$$x(k)=v(k)^2, u=[F_t F_b]' \quad \text{[Equation 2]}$$

Here, Ap, Bp, Bφ, and Φ are the following Equation 3:

$$A_p = \left(1 - \frac{1}{m}\rho c_d A_d \Delta s\right), \quad \text{[Equation 3]}$$

$$B_\phi = 1,$$

$$B_p = \left[\frac{2\Delta s}{m} \frac{-2\Delta s}{m}\right],$$

$$\Phi = -2\Delta s \cdot g(c_r \cos\theta + \sin\theta)$$

where ρ is the density of air, $c_d$ is the air resistance coefficient, and $c_r$ is the rolling resistance coefficient.

The state variable model equation of the above Equation 2 for each step is the following Equation 4.

$$x(1)=A_p x(0)+B_p u_0+B_\phi \Phi(\theta_1)$$

$$x(2)=A_p x(1)+B_p u_1+B_\phi \Phi(\theta_2)$$

$$x(3)=A_p x(2)+B_p u_2+B_\phi \Phi(\theta_3) \quad \text{[Equation 4]}$$

2. Determination of Prediction Horizon & Collection of Driving Environment Information for that Section (S40)

The prediction horizon corresponds to an information utilization section for calculating the optimal solution (target traction force and braking force) in the control method.

The prediction horizon may be configured to be set based on distance or time.

The optimal solution may be configured to be calculated by each step using information on the entire prediction horizon.

The length of one step may be defined as Δs for distance-based or as Δt for time-based. For convenience, the embodiment will be mainly described on the basis that the step is set based on distance.

Figure 7:
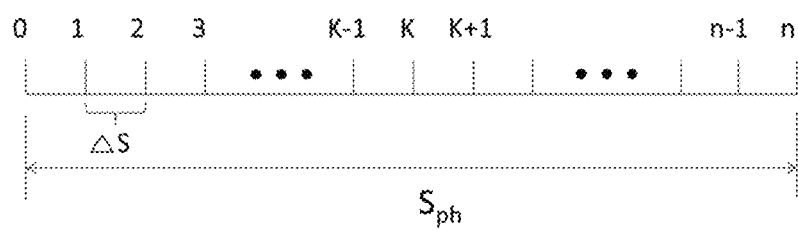
FIG. 7 illustrates an example in which the prediction horizon is divided into n steps.

FIG. 7 illustrates a prediction horizon consisting of n steps.

For example, if one step Δs is 20 m and the prediction horizon is 1500 m, the prediction horizon has a total of 75 steps.

For example, the optimal solution may be calculated using information for the section of 0 to 1500 m to obtain the target traction force and braking force for the driving control in the range of 0 to 20 m. Then, the point of 20 to 1520 m is set as a subsequent prediction horizon so that the optimal solution is calculated using information for that section to obtain the target traction force and braking force in the range of 20 to 40 m. Subsequent steps and prediction horizons are performed in the same way. In this example, the prediction horizon is kept constant at 1500 m, but the present disclosure is not limited thereto.

Figure 3:
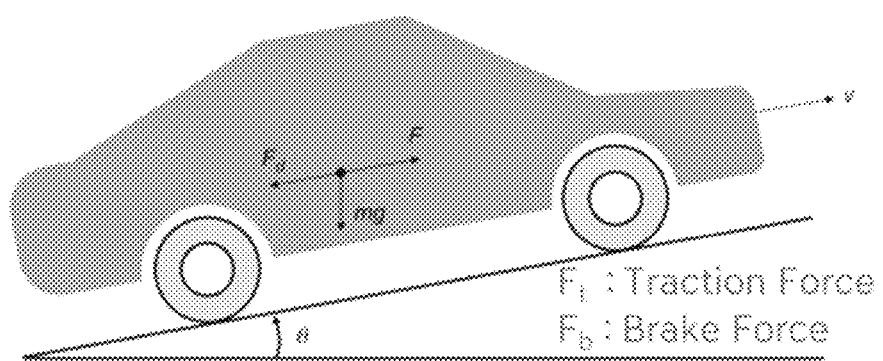
FIG. 3 is a schematic diagram of vehicle traveling for explaining an exemplary embodiment of state variable modeling of a longitudinal equation of motion.
Figure 4:
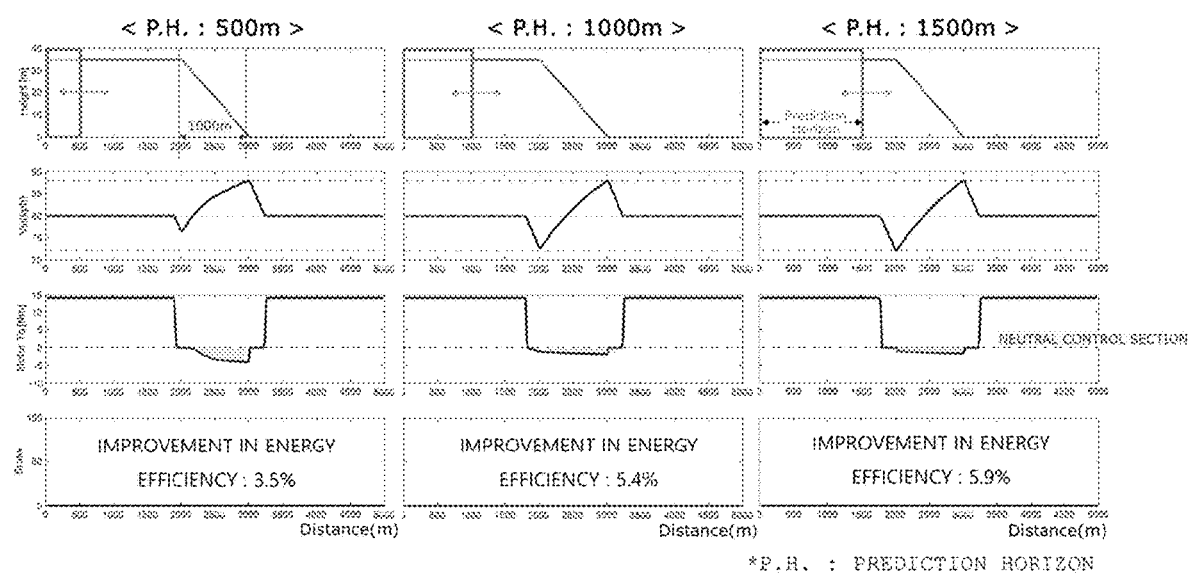
FIG. 4 illustrates a simulation result of the embodiment of the present disclosure according to the length of the prediction horizon.

FIG. 3 illustrates a result of calculating the optimal solution by changing the prediction horizon to 500 m, 1000 m, and 1500 m for a total mileage of 5000 m.

The road used in the embodiment of FIG. 3 includes a downhill section in the section of 2000 to 3000 m, and the length of one step is equal to 20 m.

The fuel efficiency improvement rate for the three cases was 3.5% for the prediction horizon of 500 m, 5.4% for the prediction horizon of 1000 m, and 5.9% for the prediction horizon of 1500 m, and the highest efficiency was for the prediction horizon of 1500 m.

The longer the prediction horizon, the more forward information is available, so that the efficiency may be further improved. However, since the computational load increases, there is a need for proper compromise.

Meanwhile, if there is a sloped section within the prediction horizon, it is possible to reduce the total number of steps and reduce computational loads by obtaining an approximate slope for the slope data and integrating the steps using the same, which will be described in detail with reference to FIGS. 8 and 9.

Figures 8A, 8B, 8C:
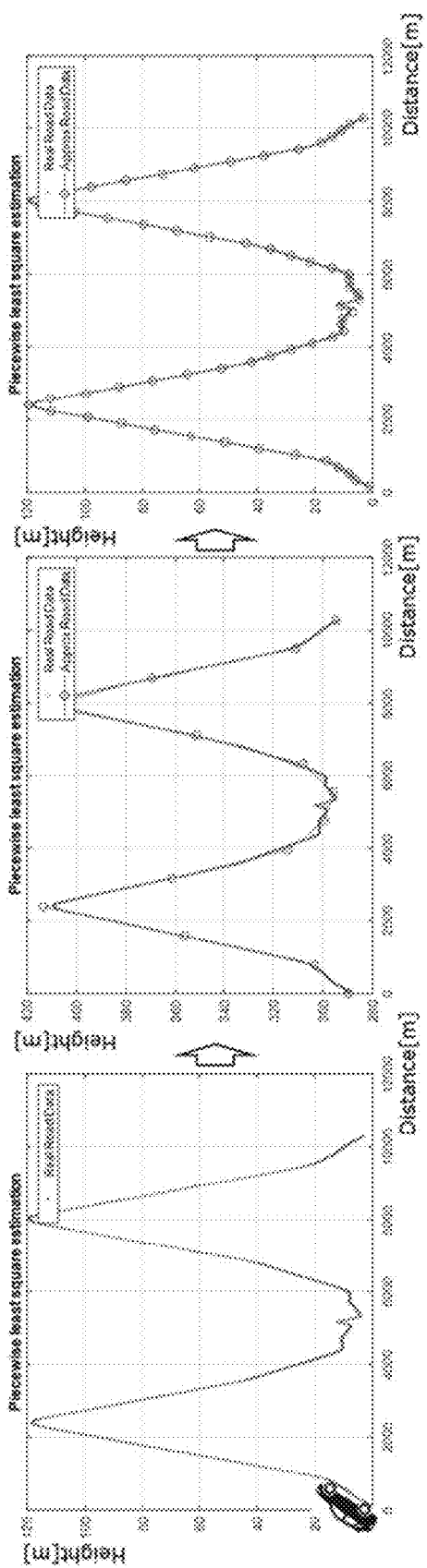
FIG. 8A-8C illustrates a state in which the number of pieces of data is reduced by approximating slopes with respect to exemplary road data.

FIG. 8 illustrates a state in which the number of pieces of data is reduced by approximating slopes with respect to exemplary road data. FIG. 8A is an example of road data having a total of 514 pieces of topographic data, which is as shown in FIG. 8B when approximated by 14 straight lines. The degree of approximation may vary depending on the required level of error with the original road data. FIG. 8C illustrates a result of approximation by 60 straight lines where the degree of error is further reduced.

In the case where one point of the road data is taken as one step in FIG. 8, FIG. 8A illustrates a prediction horizon having 514 steps and FIG. 8C illustrates a prediction horizon having 60 steps. Therefore, it is possible to significantly reduce the amount of computation through approximation. In particular, it is very effective when the optimization computational load, which will be described later, is large due to a large amount of road data, or when the efficiency improvement is insignificant compared to the approximation even through the optimal solution is calculated without approximation due to the small slope difference between the respective points on the road.

The process of approximation and step determination for the prediction horizon including the sloped section will be described in detail with reference to FIG. 2.

First, the prediction horizon is divided into Np steps (S41).

Then, after the road slope data collected from a navigation map (digital map) (S42) is approximated using a linear function, an approximate slope is calculated.

Here, the approximation may be achieved by a plurality of linear functions using a least-squares method (S43), and the number of linear functions is increased until the required level of error is reached.

That is, for example, the number of linear functions is increased and approximated until the following condition is satisfied (S44 and S45):

$$\frac{\sum(\text{slope} - \text{approximated slope})^2}{Naf} \leq \text{threshold value}$$

(where Naf indicates the number of approximation functions)

For the above condition, the value obtained by dividing the square of the error between the slope data information and the approximated slope by the "number of approximation functions" refers to an average value of the squared errors for the "number of approximation functions". A final approximation linear function is obtained by increasing the number of approximation functions until the above average value is less than or equal to the threshold value, which allows the approximate slope to be calculated.

When the approximation is completed, the number of linear approximation functions N is determined (S46), and N integration steps are determined by integrating steps having the same approximate slope except for a damping section to be described later.

Next, a slope transition section is found from the approximate slopes and the damping section is determined for the transition section (S47).

The damping section may be determined as a predetermined area before and after the point at which the approximate slope changes, and the number of steps M for the damping section may be determined to be proportional to the degree of change in its slope (i.e., the difference between both slopes).

When N integration steps and M damping section steps are determined as described above, the number of steps to be used for the computation of that prediction horizon is "N+M", which is much smaller than the initial Np (S48).

For example, how a final step to be used for computation is specifically determined for the prediction horizon of the road including a sloped section will be described with reference to FIG. 9.

When a road section as illustrated in FIG. 9A is determined as the prediction horizon, a total of 18 steps are determined for that prediction horizon as illustrated in FIG. 9B.

The slope data for the steps assumes that the first 6 steps have values of $\alpha_1$ to $\alpha_6$, and the remaining 12 steps have values of $\beta_1$ to $\beta_{12}$.

For these pieces of slope data, as illustrated in FIG. 9C, it is assumed that $\alpha_1$ to $\alpha_6$ are approximated by a single linear function, and $\beta_1$ to $\beta_{12}$ are approximated by another linear function.

When the approximate slope is calculated using the approximation function, as shown in FIG. 9D, all of the approximate slopes of the first 6 steps are $\alpha$, and the approximate slopes of the remaining 12 steps are $\beta$.

Meanwhile, since the slope is changed at $\alpha_6$ and $\beta_1$, a predetermined area before and after the change point is set as a damping section. Then, as illustrated in FIG. 9E, the existing step is maintained for the damping section as it is, and the remaining steps are integrated into an integrated step having a slope of $\alpha$ or $\beta$.

Through the approximation and integration process, the number of steps is reduced from initial 18 to 5.

As represented in Equation 5 below, the number of state variable model equations when 18 steps are applied as it is reduced to 5 by integration of the steps, which results in a significant reduction in the amount of computation. That is, since it is changed to a "blocked input" structure so that the steps having the same slope have the same solution as a result of approximation, the structure of finding the optimal solution may be very simplified, which may lead to a significant improvement in the amount and speed of computation.

$$\left.\begin{aligned}x(1) &= A_p x(0) + B_p u_0 + B_\phi \Phi(\alpha_1)\\x(2) &= A_p x(1) + B_p u_1 + B_\phi \Phi(\alpha_2)\\x(3) &= A_p x(2) + B_p u_2 + B_\phi \Phi(\alpha_3)\\x(4) &= A_p x(3) + B_p u_3 + B_\phi \Phi(\alpha_4)\\x(5) &= A_p x(4) + B_p u_4 + B_\phi \Phi(\alpha_5)\end{aligned}\right\} x(1) =$$ [Equation 5]

$$A_p x(0) + B_p u_0^* + B_\phi \Phi(\alpha)$$

$$x(6) = A_p x(5) + B_p u_5 + B_\phi \Phi(\alpha_6)$$

$$x(2) = A_p x(1) + B_p u_1^* + B_\phi \Phi(\alpha)$$

$$x(7) = A_p x(6) + B_p u_6 + B_\phi \Phi(\beta_1)$$

$$x(3) = A_p x(2) + B_p u_2^* + B_\phi \Phi(\beta)$$

$$x(8) = A_p x(7) + B_p u_7 + B_\phi \Phi(\beta_2)$$

$$x(4) = A_p x(3) + B_p u_3^* + B_\phi \Phi(\beta)$$

-continued
$$\left.\begin{array}{l}x(9) = A_p x(8) + B_p u_8 + B_\phi \Phi(\beta_3)\\x(10) = A_p x(9) + B_p u_9 + B_\phi \Phi(\beta_4)\\x(11) = A_p x(10) + B_p u_{10} + B_\phi \Phi(\beta_5)\\x(12) = A_p x(11) + B_p u_{11} + B_\phi \Phi(\beta_6)\\x(13) = A_p x(12) + B_p u_{12} + B_\phi \Phi(\beta_7)\\x(14) = A_p x(13) + B_p u_{13} + B_\phi \Phi(\beta_8)\\x(15) = A_p x(14) + B_p u_{14} + B_\phi \Phi(\beta_9)\\x(16) = A_p x(15) + B_p u_{15} + B_\phi \Phi(\beta_{10})\\x(17) = A_p x(16) + B_p u_{16} + B_\phi \Phi(\beta_{11})\\x(18) = A_p x(17) + B_p u_{17} + B_\phi \Phi(\beta_{12})\end{array}\right\} x(5) = A_p x(4) + B_p u_4^* + B_\phi \Phi(\beta)$$

As described above, after the reduced state variable model equation is used to find the minimum solution of the objective function according to the method to be described later for calculation of the optimal solutions $u^*_0$, $u^*_1$, $u^*_2$, $u^*_3$, and $u^*_4$, the optimal solutions are applied to the state variable model equations of the steps before integration in order to calculate the vehicle speed at each step. The vehicle speed in each step calculated as described above may be used to monitor various indicators, related to vehicle traveling, such as calculation of the expected driving time.

$$x(1) = A_p x(0) + B_p u_0^* + B_\phi \Phi(\alpha)$$
$$x(2) = A_p x(1) + B_p u_0^* + B_\phi \Phi(\alpha)$$
$$x(3) = A_p x(2) + B_p u_0^* + B_\phi \Phi(\alpha)$$
$$x(4) = A_p x(3) + B_p u_0^* + B_\phi \Phi(\alpha)$$
$$x(5) = A_p x(4) + B_p u_0^* + B_\phi \Phi(\alpha)$$
$$x(6) = A_p x(5) + B_p u_1^* + B_\phi \Phi(\beta)$$
$$x(7) = A_p x(6) + B_p u_2^* + B_\phi \Phi(\beta)$$
$$x(8) = A_p x(7) + B_p u_3^* + B_\phi \Phi(\beta)$$
$$x(9) = A_p x(8) + B_p u_4^* + B_\phi \Phi(\beta)$$
$$x(10) = A_p x(9) + B_p u_4^* + B_\phi \Phi(\beta)$$
$$x(11) = A_p x(10) + B_p u_4^* + B_\phi \Phi(\beta)$$
$$x(12) = A_p x(11) + B_p u_4^* + B_\phi \Phi(\beta)$$
$$x(13) = A_p x(10) + B_p u_4^* + B_\phi \Phi(\beta)$$
$$x(14) = A_p x(13) + B_p u_4^* + B_\phi \Phi(\beta)$$
$$x(15) = A_p x(14) + B_p u_4^* + B_\phi \Phi(\beta)$$
$$x(16) = A_p x(15) + B_p u_4^* + B_\phi \Phi(\beta)$$
$$x(17) = A_p x(16) + B_p u_4^* + B_\phi \Phi(\beta)$$
$$x(18) = A_p x(17) + B_p u_4^* + B_\phi \Phi(\beta) \quad \text{[Equation 6]}$$

For example, FIG. 10 illustrates the results of calculating the optimal solution and the resulting velocity profile where road data before approximation is used as it is and where approximation is performed.

Figures 10A, 10B:
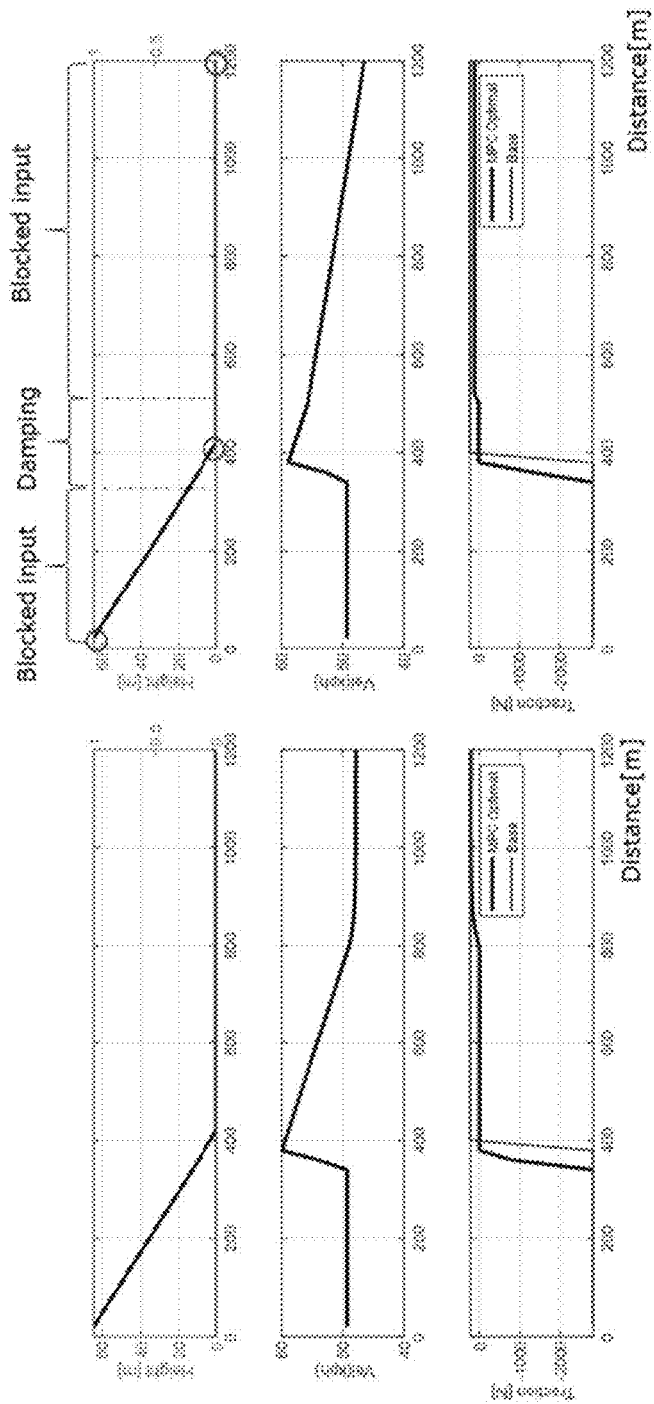
FIGS. 10A and 10B illustrates a comparison of velocity profiles and optimal solution results before and after approximation.

FIG. 10A illustrates the use of the slope data before approximation, and FIG. 10B illustrates the simplification of the same into two approximate slopes.

As illustrated in FIGS. 10A and 10B, it can be seen that, although approximation is performed, the velocity profile satisfies the constraints (vehicle speed band constraint and average driving speed constraint) well compared to where approximation is not performed.

In addition, the result of the optimal solution (traction force) in the transition section may vary depending on the setting of the number of steps, etc. Accordingly, as the number of steps increases, the base result may be closely matched. However, it is desirable to compromise at an appropriate level because the result has a trade-off relationship with the amount and speed of computation.

When the prediction horizon is determined, the driving environment information about that prediction horizon is collected.

Here, the driving environment information may include real-time variation information and non-variation information (which is at least not changed during driving in that prediction horizon).

For example, the real-time variation information includes distance information from preceding vehicle, and the non-variation information includes road-shape-related information such as the curvature and slope of the road, speed limit information assigned to a specific road section, enforcement camera location information, and the like.

Here, for example, the distance information with preceding vehicle may be collected by a distance sensor such as radar or LiDAR, and all types of non-variable information may be collected from map data of navigation, which is one of the digital maps. Of course, it is not necessary to limit the means for acquiring non-variable information to navigation.

3. Objective Function (S50)

(1) Wheel Power & Battery Power Computation (S51 and S52)

First, the wheel power $P_m$ may be defined as in the following Equation 7.

$$P_m = F_t v \quad \text{[Equation 7]}$$

Since the energy source for driving wheels is a battery, the time-based battery power using the wheel power may be defined as in the following Equation 8:

when $F_t \geq 0$ (driving, discharging) [Equation 8]

$$P_{b,t} = \frac{P_m}{\eta_{total}} = \frac{F_t v}{\eta_m \eta_{b,dis}}$$

when $F_t < 0$ (back driving, charging)

$$P_{b,t} = P_m \cdot \eta_{total} = F_t v \cdot \eta_m \eta_{b,cha}$$

where $\eta_m$ indicates the motor efficiency, and $\eta_b$ indicates the battery charging/discharging efficiency.

In addition, the distance-based battery power may be defined as in the following Equation 9.

when $F_t \geq 0$ (driving, discharging) [Equation 9]

$$P_{b,s} = \frac{P_{b,t}}{v} = \frac{F_t}{\eta_m \eta_{b,dis}}$$

when $F_t < 0$ (back driving, charging)

$$P_{b,s} = \frac{P_{b,t}}{v} = F_t \cdot \eta_m \eta_{b,cha}$$

(2) Battery Power Approximation (S54)

The approximation of battery power may be made on the basis of time or distance. For the sake of describing convenience, the approximation of the distance-based battery power will be described below.

The battery power may be approximated in a primary plane or secondary plane in the plane of state variables and input variables.

Figure 5A:
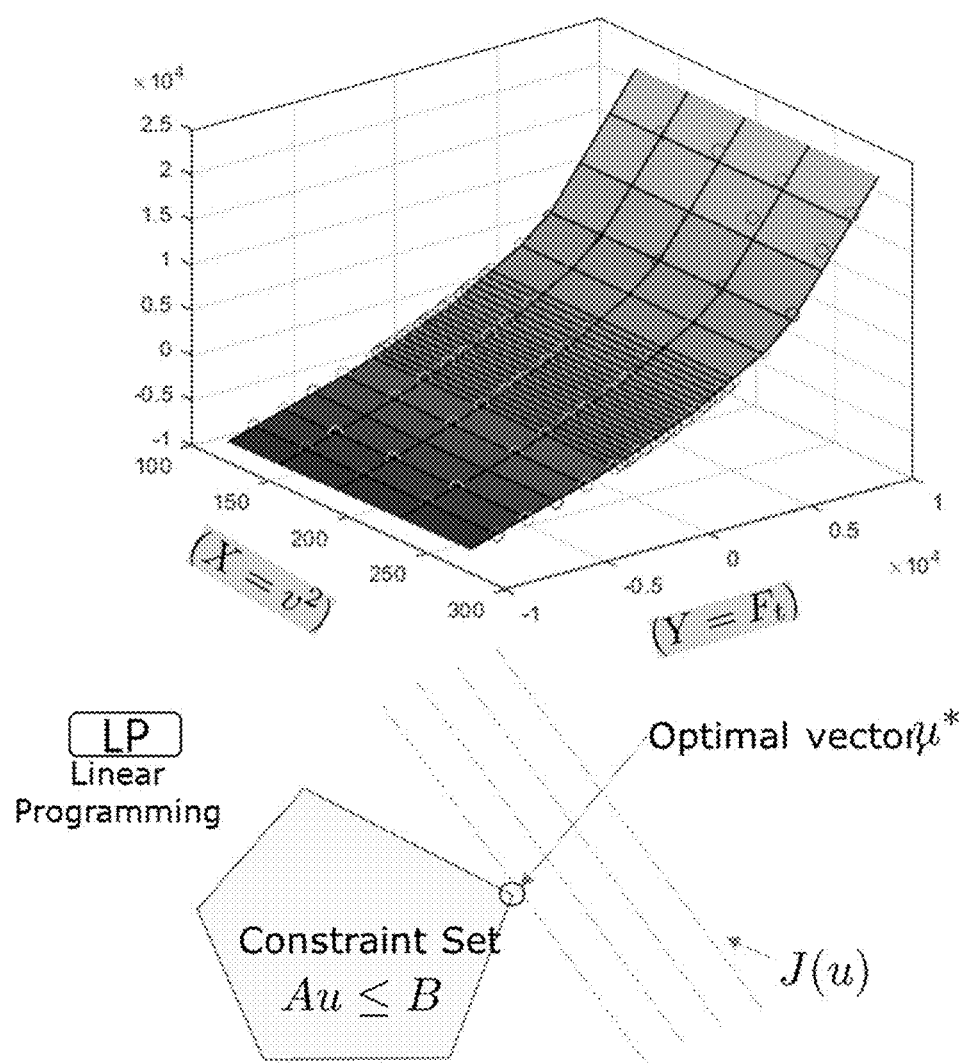
FIGS. 5A and 5B illustrate primary and secondary plane approximations to battery power.
Figure 5B:
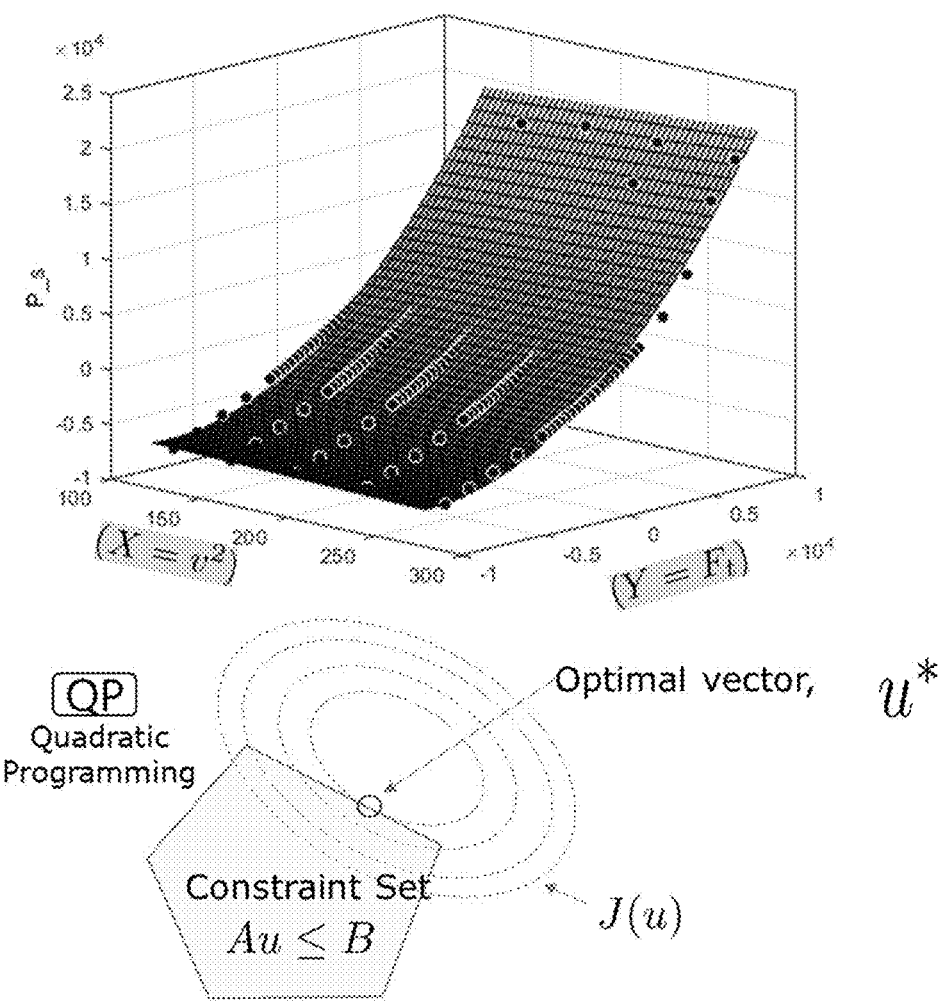

FIG. 5A illustrates the approximation of the primary plane, and FIG. 5B illustrates the approximation of the secondary plane. In the case of the primary plane approximation, when calculating the optimal solution for the objective function J, the solution may be obtained only at the vertices of the constraints (Au≤B, all constraints may be expressed as input variables using the state variable model equation as described later). Therefore, it is preferable to use the secondary plane approximation.

In the case of the secondary plane approximation, the battery power may be represented as in the following Equation 10 as a function of state variables and input variables, and coefficients p00, p10, p01, and p02 are obtained through secondary plane fitting.

$$P_{b,s}(F_t, v^2) = p00 + p10 \cdot V^2 + p01 \cdot F_t + p20 \cdot v^4 + p11 \cdot v^2 F_t + p02 \cdot F_t^2 \qquad \text{[Equation 10]}$$

In this case, since a large error may occur when the entire trajectory is fitted to the secondary plane, accuracy may be enhanced by selecting and fitting only the set band area of the target vehicle speed.

Figure 6:
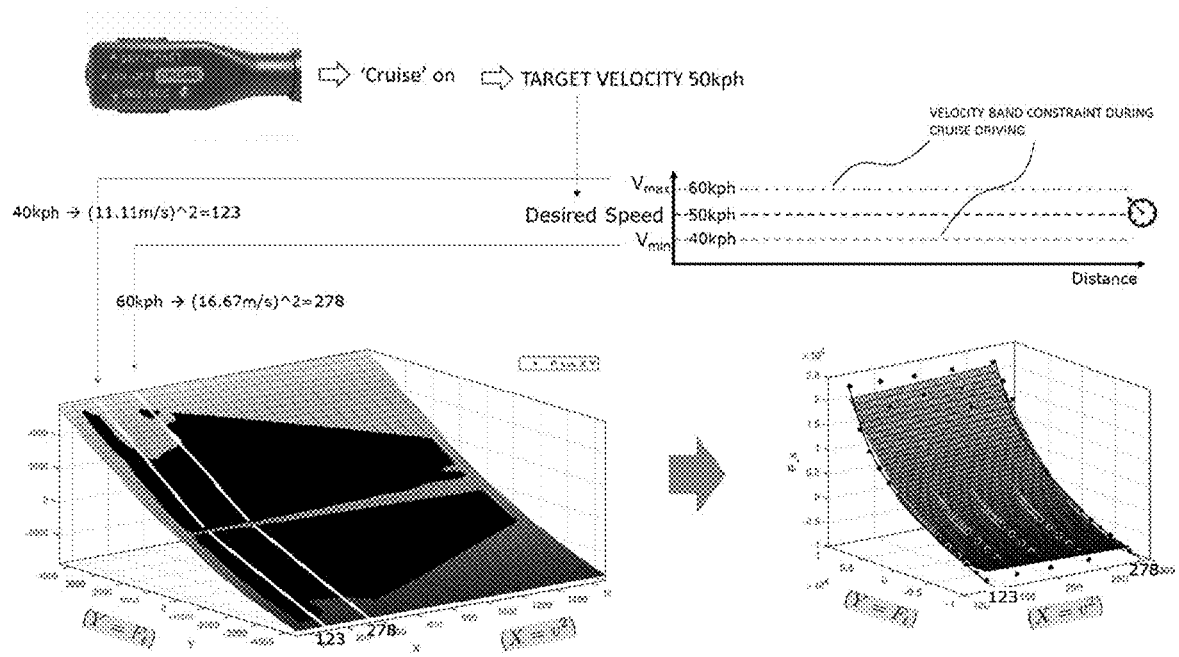
FIG. 6 illustrates an example of secondary plane approximation of battery power based on the target vehicle speed set in cruise control.

That is, as illustrated in FIG. 6, when the driver selects the vehicle speed of 50 kph as the cruise control setup, the fitting is performed only in the area of 123 to 278 kph, which is the speed band area of +10 kph.

Meanwhile, the battery power function may be expressed as a function of only input variables without state variables using the above-mentioned model equation.

(3) Generation of Target Vehicle Speed Following Function (S53)

The target vehicle speed following function is to follow the target vehicle speed in the case of flat driving without road slopes, and may be defined as in the following Equation 11.

$$(v(k+1)^2 - V_{target}^2)^2 \qquad \text{[Equation 11]}$$

(4) Collection of Objective Function (S55)

First, for example, the prediction horizon is divided into n steps of Δs in the total distance of "$S_{ph}$" for computation, as illustrated in FIG. 7.

A final objective function obtained by summing the battery function and the target vehicle speed following function for the prediction horizon is the following Equation 12:

$$J = \sum_{k=0}^{n-1} w_1 \cdot P_{b,s} \Delta s + w_2 \cdot \left(v(k+1)^2 - V_{target}^2\right)^2 + s_1 \cdot \epsilon_{k+1}^2 + s_2 \cdot \epsilon_{k+1} \qquad \text{[Equation 12]}$$

where ε indicates the soft constraint, and is to allow instantaneous violation for constraints. For example, it may be set for the turbo speed limit condition, and the amount of violation is denoted as ε and is determined by setting the primary and secondary weights $s_1$ and $s_2$ in the objective function.

In addition, $w_1$ and $w_2$ are the weights in which $w_1$ is the weight for battery power and $w_2$ is the weight for target vehicle speed following function.

State variables and input variables for the n steps may be expressed in the form of column vectors U and X, respectively, which may be used to represent the battery power function of the above Equation 12 in the form of a vector as in the following Equation 13.

$$w_1 \sum_{k=0}^{n-1} P_{b,s} \cdot \Delta s = w_1 \cdot P_{b,s}(U, X) \cdot \Delta s \qquad \text{[Equation 13]}$$

The above Equation 13 may be represented as in the following Equation 14 by approximating the same to a secondary plane as described above.

$$w_1(p00 + p10 \cdot X + p01 \cdot U + p11 \cdot XU + p02 \cdot U^2)\Delta s \qquad \text{[Equation 14]}$$

In addition, the above state variable model equation is expressed in the form of a vector as in the following Equation 15, and the battery function is summarized as in the following Equation 16 by substituting and applying the same into the above Equation 14.

$$X = \overline{A}x(0) + \overline{B}U + \overline{B}_\phi \Phi \qquad \text{[Equation 15]}$$

$$w_1 p 10 \overline{B} U \Delta s + w_1 p 01 \cdot U \Delta s + w_1 \cdot p 11 ( \overline{A}x(0) + B_\phi \Phi) U \Delta s + U^T w_1 (p 11 \overline{B}^T + p 02) \Delta s \cdot U \qquad \text{[Equation 16]}$$

The target vehicle speed following function may also be expressed in the form of a vector, and may be represented as in the following Equation 17:

$$w_2 U^T \overline{B}^T \overline{B} U + [2w_2 X(0) \overline{A}^T \overline{B} + 2w_2 \Phi^T \overline{B}_\phi^T \overline{B} - 2w_2 V_{target} \overline{B}] U + C \qquad \text{[Equation 17]}$$

where C is a constant, which may be excluded.

4. Constraint (S60)

(1) Average Vehicle Speed Constraint (S61)

The average vehicle speed constraint is to follow the cruise control target vehicle speed, for example, and may be set as a condition in which the average value of $v^2$ is larger than the square of the predetermined target speed $v_{target}$ within the prediction horizon.

That is, the average vehicle speed constraint may be represented as in the following Equation 18:

$$\frac{x(1) + x(2) + \ldots + x(N_p)}{N_p} \geq V_{target}^2 \cdot \alpha \qquad \text{[Equation 18]}$$

where α is the adjustment parameter, and $N_p$ is the integer indicating the number of steps in the prediction horizon, which is the same as n in the above Equation 11.

If α is set as a time penalty, it is possible to respond to the need for improvement in additional efficiency even if the loss of driving time is suffered by the driver's intention.

Due to characteristics of electric vehicles, in the case in which the remaining travelable distance is insufficient in terms of battery power and thus active using of energy-saving driving is needed, this may be addressed using α. That is, as α is larger, the efficiency improvement rate decreases and the driving time is shorter. Conversely, as a is smaller, the efficiency improvement rate increases and the driving time is longer.

Meanwhile, although omitted herein, the above constraint may also be expressed in the form of a vector form by substituting and applying the state variable model equation.

(2) Vehicle Driving Speed Band Constraint (S62)

For example, the constraint is a vehicle speed band constraint of ±Δv for the cruise control target vehicle speed.

When the vehicle travels on the road with a longitudinal slope, an allowable ±Δv is required in addition to the target vehicle speed for energy-efficient driving.

Figure 11:
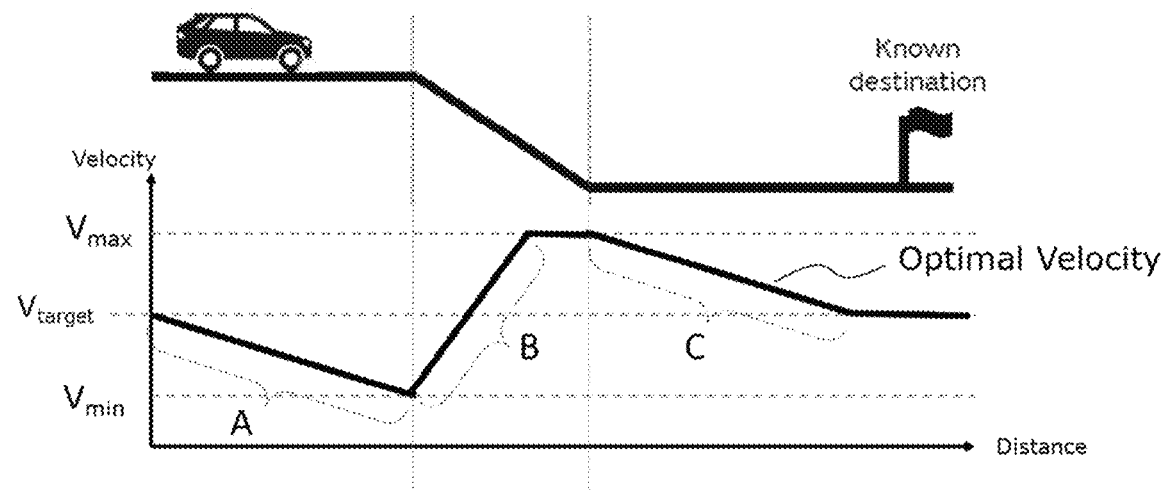
FIG. 11 is a diagram for explaining an example of a "vehicle driving speed band constraint"

For example, as illustrated in FIG. 11, when the cruise control target vehicle speed $v_{target}$ is set, it is allowed to deviate from the target vehicle speed $v_{target}$ within the range of maximum speed $v_{max}$ and minimum speed $v_{min}$ before and after downhill driving.

That is, the vehicle speed is decreased to the minimum speed $v_{min}$ less than or equal to the target vehicle speed $v_{target}$ in the "A" section before downhill driving, is increased to the maximum speed $v_{max}$ during regenerative braking in some "B" sections, including the initial stage of downhill driving to be maintained, and then returns back to the target vehicle speed $v_{target}$ while increasing fuel efficiency through neutral control in the "C" section after downhill driving.

The vehicle driving speed band constraint is represented as in the following Equation 19:

$$v_{min}^2 - \epsilon \leq x \leq v_{max}^2, \epsilon \geq 0 \quad \text{[Equation 19]}$$

where $\epsilon$ is for treating the constraint as a soft constraint to secure a safe distance from a preceding vehicle.

(3) Motor Constraint For Vehicle Speed (S63)

The constraint is a constraint due to the torque limit of the drive motor.

Figure 12:
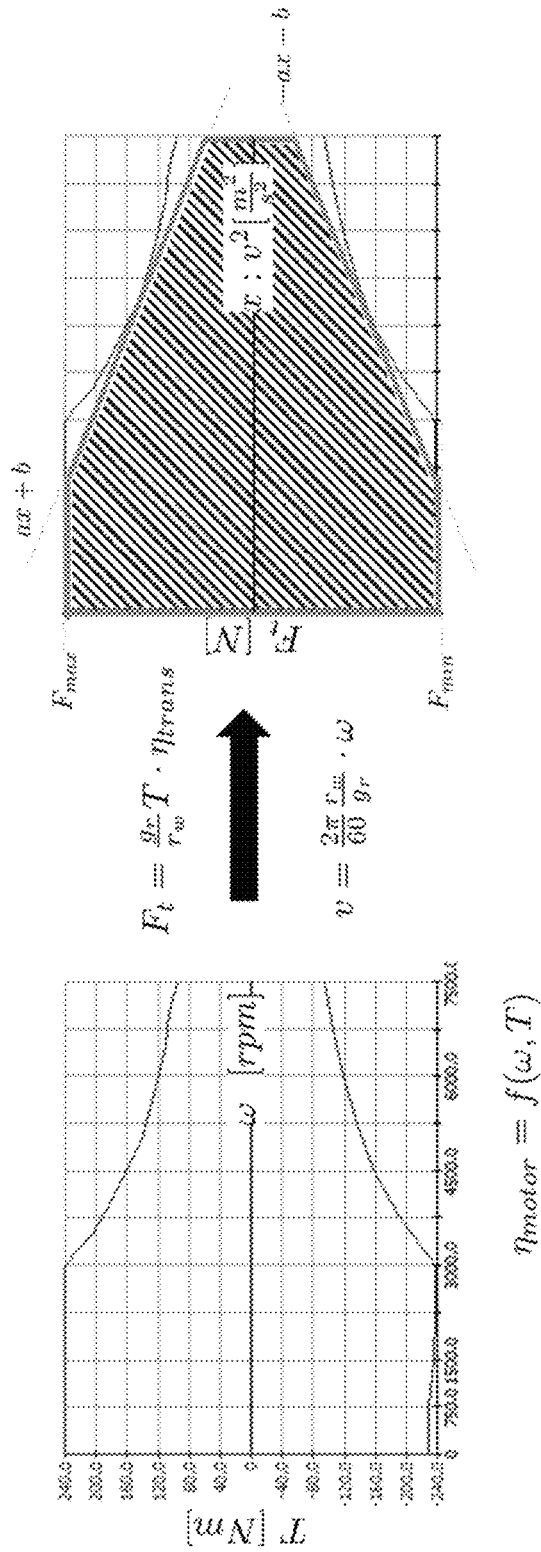
FIG. 12 is a diagram for explaining an example of a "motor constraint for vehicle speed"

The left diagram of FIG. 12 illustrates a motor diagram, which is the same as the right diagram when the state variable and input variable are changed and the curved part of the motor diagram is approximated to a straight line.

In FIG. 12, $F_{max}$ and $F_{min}$ are represented as in the following Equation 20.

$$F_{max} \frac{g_r}{r_w} T_{max} \cdot \eta_{trans}, \quad \text{[Equation 20]}$$

$$F_{min} = \frac{g_r}{r_w} T_{min} \cdot \eta_{trans}$$

For example, the constraint is to restrict the traction force and the braking force within the shaded area in the right diagram of FIG. 12, and the maximum and minimum conditions are represented as in the following Equation 21:

$$F_{t,min} \leq \text{input}, u \leq F_{t,max} \quad \text{[Equation 21]}$$

where $F_{t,max}$ and $F_{t,min}$ are represented as in following Equation 22.

$$F_{t,min} = \max(F_{min}, -ax-b), F_{t,max} = \min(F_{max}, ax+b) \quad \text{[Equation 22]}$$

(4) Safe Distance Constraint From Preceding Vehicle (S64)

Figure 13:
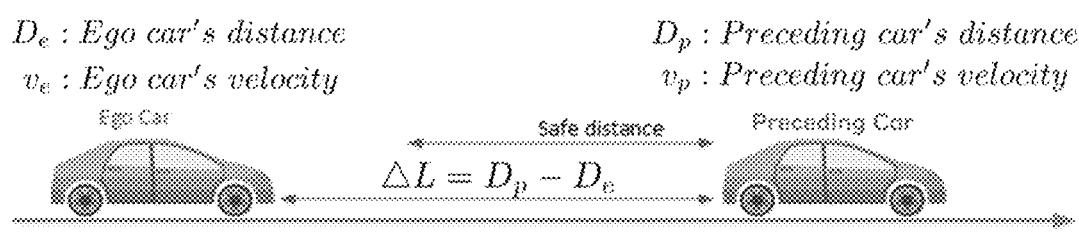
FIG. 13 is a diagram for explaining an example of a "safe distance constraint from preceding vehicle"

The constraint is a condition to secure a safe distance from the preceding vehicle as illustrated in FIG. 13.

The distance $\Delta L$ between the ego car and the preceding car must be greater than a predetermined safe distance $\Delta L_s$. That is, the constraint is represented as in the following Equation 23:

$$\Delta L(k+1) \geq \Delta L_s(k+1) \quad \text{[Equation 23]}$$

where the right side of the above equation may be defined as in the following Equation 24 using the proportional constant h and the minimum safe distance $l$ during stop.

$$\Delta L_s(k+1) = h \cdot v_e(k+1) + l \quad \text{[Equation 24]}$$

By substituting the above Equation 24 into the above Equation 23 and arranging the same, the final constraint may be represented as in the following Equation 25.

$$v(k)^2 \leq \left(\frac{\Delta L(k) - l}{h}\right)^2 \quad \text{[Equation 25]}$$

(5) Vehicle Speed Constraint For Road Curvature (S65)

The constraint is a condition to limit the maximum vehicle speed for safety when the vehicle turns.

Figure 14:
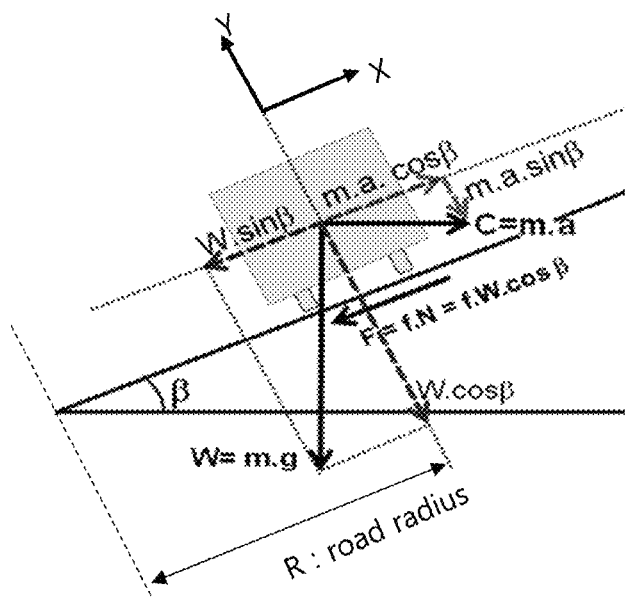
FIG. 14 is a diagram for explaining an example of a "safe vehicle speed constraint for road curvature"

In the state in which the vehicle travels as illustrated in FIG. 14, the maximum vehicle speed for safety may be obtained under the condition that the sum of all forces acting on the vehicle with respect to the lateral slope of the road (the slope of the road bank part) $\beta$, the curvature of the road $\tilde{k}$, and the friction coefficient on the road surface f is 0 (zero). The constraint limiting the vehicle speed to less than or equal to the maximum vehicle speed may be represented as in the Equation 26:

$$v^2 \leq \frac{g \cdot (\tan\beta + f)}{k} \quad \text{[Equation 26]}$$

where g is the acceleration of gravity.

Although these five types of constraints have been described, the present disclosure is not limited thereto. It is natural that additional constraints may be further provided in consideration of safety, efficiency, driver's needs, and so on.

Although omitted herein, all of the preceding constraints may also be expressed as input variables using the state variable model equation, and may be expressed in the form of a vector.

5. Optimal Solution Calculation (S70)

This step is a process of calculating an optimal solution (minimum solution) by applying the above constraints to the above-mentioned objective function.

Figure 15:
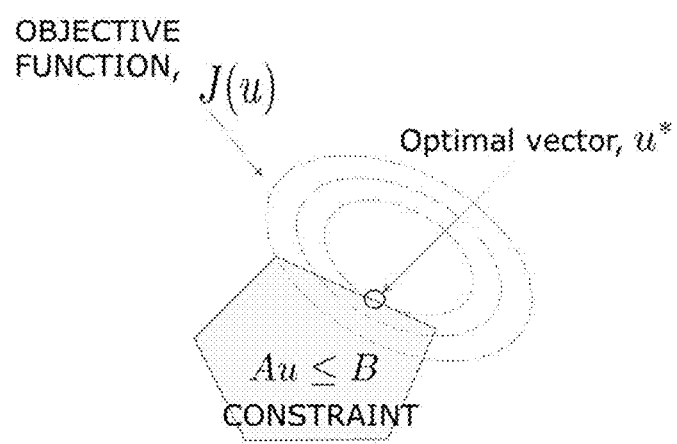
FIG. 15 schematically illustrates a process of finding an optimal solution of an objective function that satisfies constraints.

FIG. 15 schematically illustrates the optimal solution calculation process. As illustrated, the optimal traction force $u_{1opt}$ and the optimal braking force $u_{2opt}$ are calculated by applying the above constraints to the quadratic programming method.

The optimal solution may be obtained as an optimal solution vector u* for all the steps in the prediction horizon, and only a first input value (the optimal solution corresponding to the first step in FIG. 7) may be used.

That is, the optimal solution is expressed by traction force and braking force. The optimal solution of the quadratic programming method is obtained at every step (distance step $\Delta s$ or time step $\Delta t$), and it is possible to extend to the iterative structure that controls using only the first input value, that is, model predictive control (MPC) control.

The distribution of regenerative braking may be determined according to the magnitude of the braking force obtained as the optimal solution (S80), which will be described below.

Figure 16:
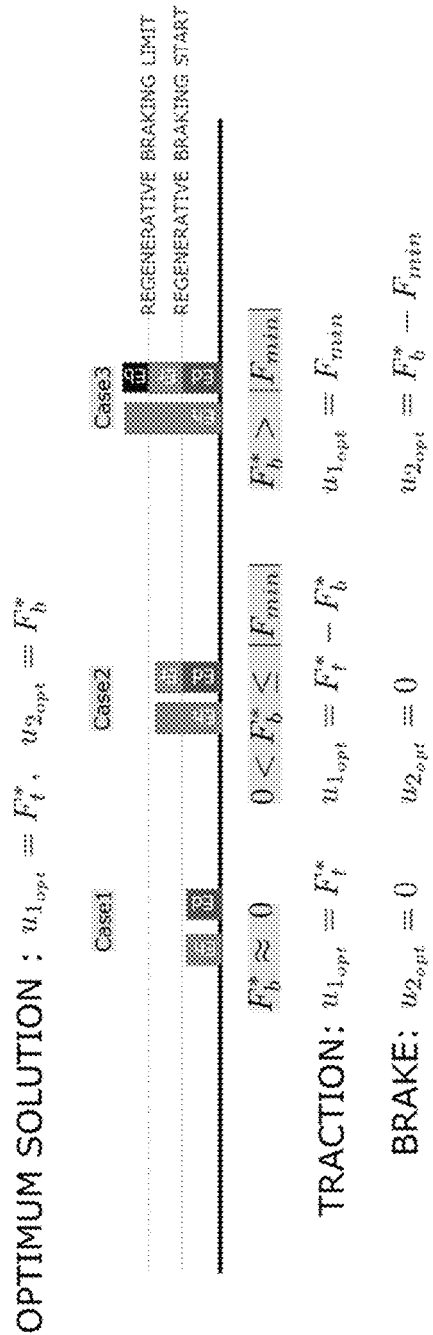
FIG. 16 is an example of distribution to regenerative braking and/or mechanical braking.

First, FIG. 16 illustrates regenerative braking distribution for three cases. In FIG. 16, Eh refers to the gravitational potential energy (just before downhill driving), $E_d$ refers to the kinetic energy, $E_r$ refers to the regenerative braking energy, and $E_b$ refers to the energy dissipated by mechanical braking.

For "case 1", the vehicle's gravitational potential energy is converted to kinetic energy by the traction force. As the result of the optimal solution, the traction force $F_t^*$ is equal to or greater than 0 and the braking force $F_b^*$ is 0, so that no braking force is required.

For "case 2", the calculated $F_b^*$ is greater than 0 and less than or equal to "absolute value of $F_{min}$" or less, so that all of the entire calculated braking force is distributed to regenerative braking. In this case, the traction force is controlled by "$F_t^*$–$F_b^*$" in consideration of regenerative braking. Here, $F_{min}$ is the value indicative of the maximum limit of regenerative braking of the motor as the force at the wheel in consideration of the radius, the gear ratio, the efficiency, or the like.

For "case 3", the calculated $F_b^*$ is equal to or greater than the threshold value due to very large gravitational potential energy, so that the regenerative braking is distributed to the maximum and the difference "$F_b^*-F_{min}$" is distributed to mechanical braking.

Figure 17:
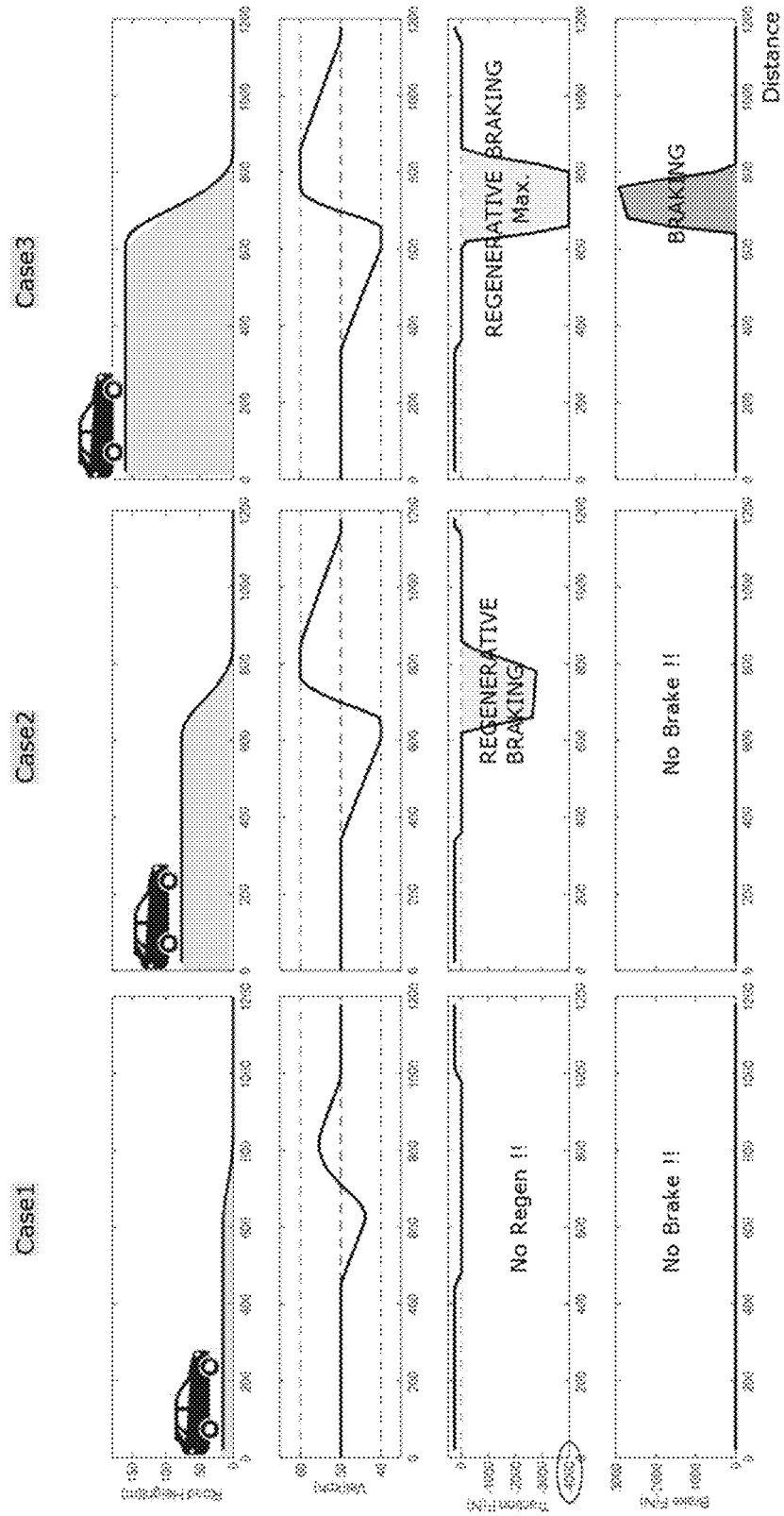
FIG. 17 is a diagram schematically illustrating conditions such as road height, vehicle speed, traction force, regenerative braking, and mechanical braking force according to the vehicle traveling in each case of FIG. 16.

FIG. 17 illustrates the control state such as the vehicle speed, traction force, regenerative braking, and mechanical braking according to the moving distance of the vehicle in these three cases.

Figure 18A:
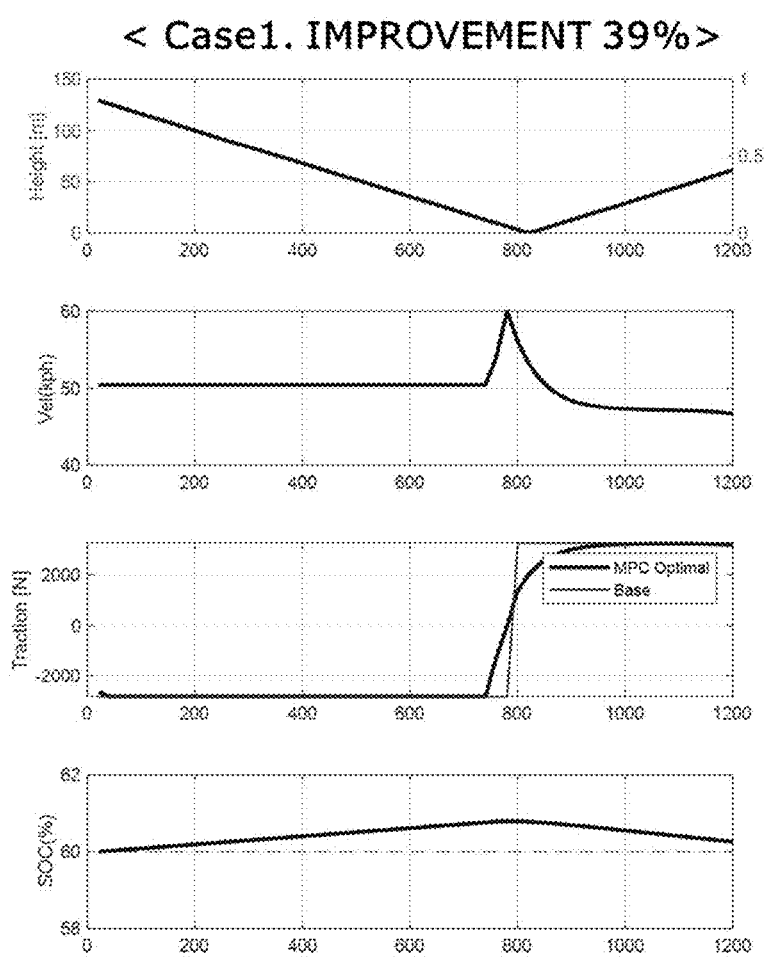
FIG. 18($a$)-($c$) illustrates a simulation result of an exemplary embodiment of the present disclosure for three types of roads.
Figure 18B:
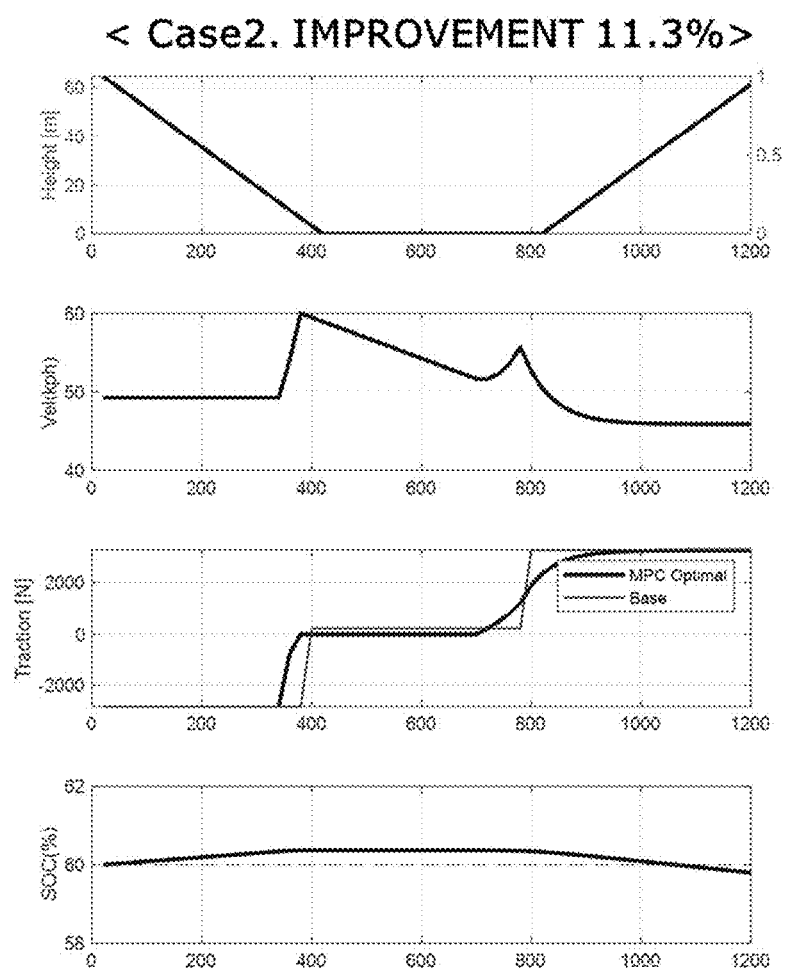
Figure 18C:
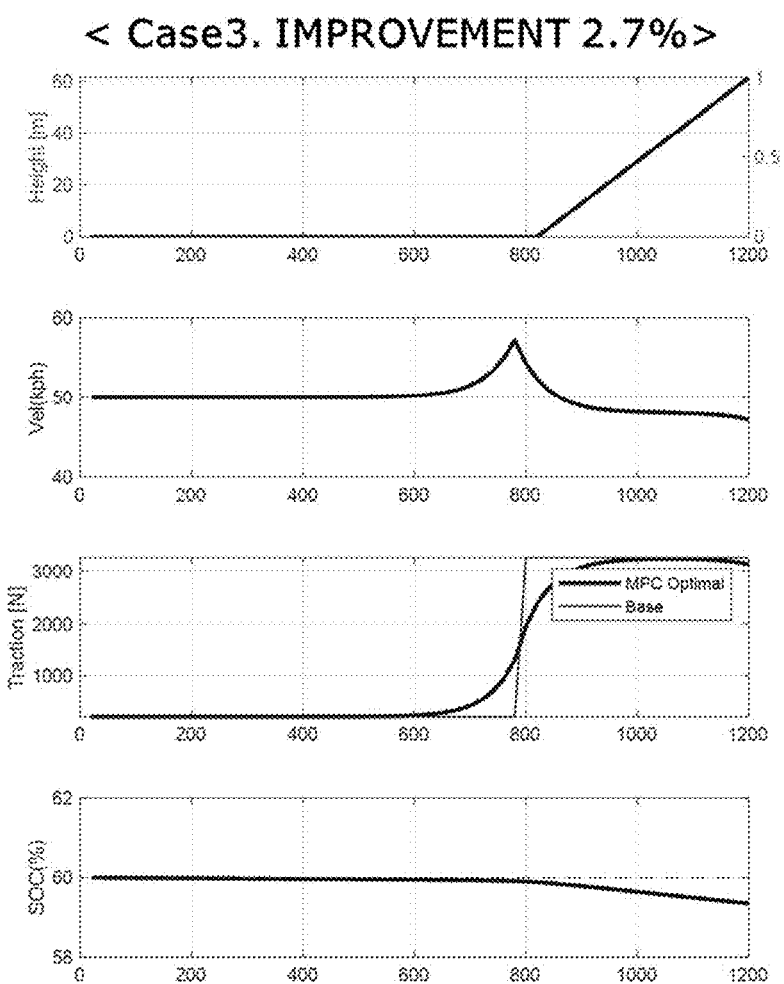

FIGS. 18A, 18B, and 18C illustrate the simulation results of vehicle speed, traction force, and battery state of charge (SOC) when the vehicle travels on three types of roads according to the method of the embodiment. For "case 1" where the downhill section is long and the uphill section is short, the improvement rate of 39% was achieved, and for "case 2" where the downhill and uphill sections have the same slope and length, the improvement rate of 11.3% was achieved. On the other hand, for "case 3" where there is no downhill section and only an uphill section, the improvement rate of only 2.7% was achieved.

It can be seen from these results that the control of the embodiment may have a low improvement in fuel efficiency for the topography of only simple flatland and uphill, but have a significant improvement in efficiency for the downhill topography.

The fuel efficiency is improved at the point where the vehicle's kinetic energy is known in advance when the road slope changes and it is preemptively controlled.

Figure 19:
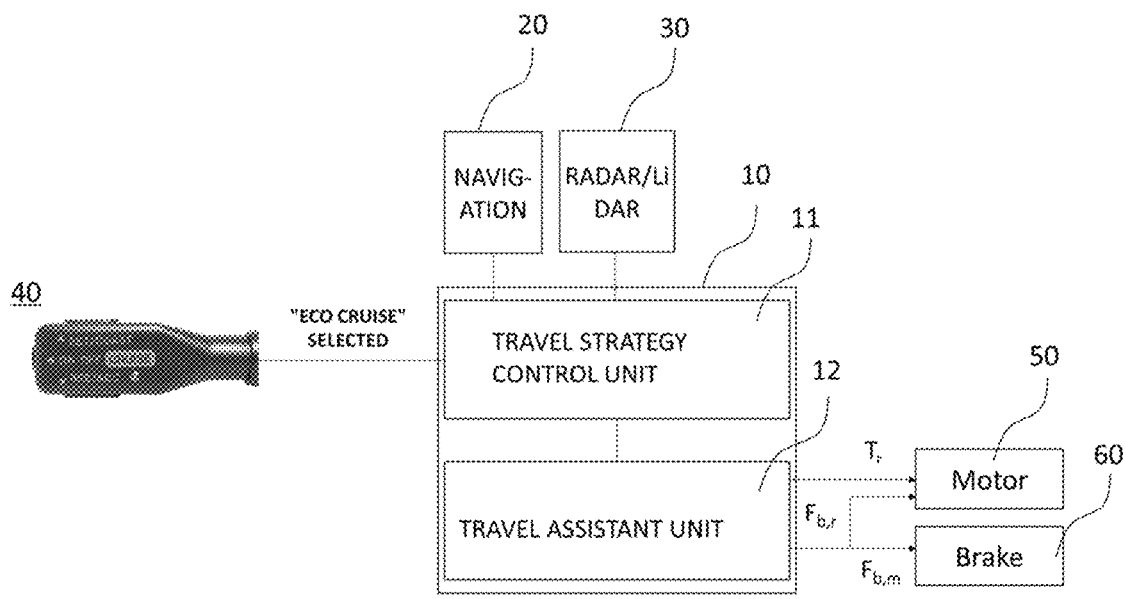
FIG. 19 illustrates a driving control system according to an exemplary embodiment of the present disclosure.

Meanwhile, as illustrated in FIG. 19, the control method of the present disclosure may be included in and implemented by a vehicle driving control system 10 including a driving strategy control unit 11 and a driving assistance unit 12.

When the driver selects, for example, the "eco cruise" mode through the driving mode selector 40, a target vehicle speed for cruise control is determined, road slope and curvature information, road speed limit information, enforcement camera location information, and the like are collected from the navigation map data 20 for each prediction horizon, and distance information from preceding vehicle is collected from the radar or LiDAR sensor 30. The collected information is used to obtain the optimal traction force and braking force for that prediction horizon through the above-mentioned equations and the optimal solution calculation process.

The resulting traction force and braking force are transmitted to the driving assistance unit 12, and the driving assistance unit 12 transmits the target driving torque and braking force to the motor 50 and the brake 60 so as to be used for control.

Here, the regenerative braking distribution as described above may be determined according to the magnitude of the braking force calculated as the optimal solution, and the distribution result may be transmitted to the driving assistance unit 12. In FIG. 19, $F_{b,r}$ indicates the regenerative braking force and $F_{b,m}$ indicates the mechanical braking force of the brake.

In the embodiment, the driving strategy control unit 11 may include a data input/output device, at least one processor for performing decision, computation, determination, and the like, and a memory for storing an operating system or logic command, input/output information, and the like. In addition, the driving strategy control unit 11 may further include a communication device when it is necessary to receive information through communication from the outside. However, the communication device may be separately provided in the vehicle and the driving strategy control unit 11 may be configured to only receive that information through the input/output device.

In addition, the driving assistance unit 12 may include a data input/output device, at least one processor for performing decision, computation, determination, and the like, and a memory for storing an operating system or logic command, input/output information, and the like.

The driving strategy control unit 11 and the driving assistance unit 12 do not need to be physically separated and may be configured as a single integrated unit. The integrated unit may also include a data input/output device, at least one processor for performing decision, computation, determination, and the like, and a memory for storing an operating system or logic command, input/output information, and the like. In this case, for example, one processor is responsible for not only performing functions such as decision and computation for the driving strategy control unit 11, but also performing functions for the driving assistance unit 12.

In addition, the vehicle driving control system 10 according to the above embodiment may be applied to any vehicle capable of being powered by a motor, such as a hybrid vehicle or an electric vehicle.

As is apparent from the above description, according to at least one embodiment of the present disclosure, it is possible to achieve optimal driving control in terms of energy efficiency in the vehicle driven by the battery and the motor, for example, in the electric vehicle or the hybrid vehicle, with the improved amount and speed of computation.

According to at least one embodiment of the present disclosure, it is possible to achieve more improved driving control in terms of energy efficiency, either by unique driving control technology or in combination with existing driving control technology such as cruise control.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A method of providing vehicle predictive control, comprising:
    determining a driving prediction horizon in front of a vehicle;
    dividing the driving prediction horizon into a plurality of steps, at least some of the plurality of steps each corresponding to a sloped section being integrated into one step according to slopes;
    applying a driving prediction model, which is based on a relationship between state variable of vehicle speed and input variables of a traction force and a braking force, for each step of the plurality of steps; and
    collectively computing the driving prediction model over the prediction horizon to calculate control values for the vehicle.

2. The method according to claim 1, wherein integration of the plurality of steps is made in relation to an approximate slope (θ) for the slopes.

3. The method according to claim 2, further comprising calculating the approximate slope from an approximate linear function for the slopes.

4. The method according to claim 3, further comprising obtaining the slopes from slope data corresponding to the sloped section of a digital map.

5. The method according to claim 3, wherein the slopes are approximated by a plurality of linear functions according to an error with the approximate slope.

6. The method according to claim 5, wherein the plurality of linear functions are determined such that an average value of squares of the error to a number of linear functions is less than or equal to a threshold value.

7. The method according to claim 6, wherein the driving prediction model comprises a battery power function for each of the plurality of steps.

8. The method according to claim 7, further comprising calculating, using the driving prediction model, the control value by calculating a minimum solution for the battery power function using at least one of an average vehicle speed constraint, a vehicle driving speed band constraint, a motor constraint for vehicle speed, a safe distance constraint from a preceding vehicle, and a safe vehicle speed constraint for road curvature.

9. The method according to claim 2, further comprising integrating steps, of the plurality of steps, having a same approximate slope into one step.

10. The method according to claim 9, wherein steps, of the plurality of steps, before and after a point at which the approximate slope is changed, are not integrated into the one step but remain unchanged.

11. The method according to claim 9, further comprising calculating a vehicle speed for steps before the integration from the relationship based on the traction force and the braking force calculated for the integrated one step.

12. A vehicle driving control system comprising:
a driving strategy control unit configured to:
   collect curvature and slope information, speed limit information, and enforcement camera location information for a road section in a forward driving prediction horizon; and
   collect distance information from a preceding vehicle from a sensor to calculate a control value for a vehicle from a driving prediction model for the driving prediction horizon using at least one of an average vehicle speed constraint, a vehicle driving speed band constraint, a motor constraint for vehicle speed, a safe distance constraint from a preceding vehicle, and a vehicle speed constraint for road curvature; and
a driving assistance unit configured to output a control signal for a motor and a brake based on the control value,
wherein the driving strategy control unit is configured to:
   divide the driving prediction horizon into a plurality of steps, at least some of the plurality of steps corresponding to a sloped section being integrated into one step according to slopes; and
   apply the driving prediction model for each step, of the plurality of steps, and collectively compute the driving prediction model over the driving prediction horizon to calculate the control value.

13. A vehicle comprising a vehicle control system, of claim 12.

* * * * *